(12) United States Patent
Kim (10) Patent No.: US 7,612,657 B2
(45) Date of Patent: Nov. 3, 2009

(54) BACK WARNING BUZZER SYSTEM FOR VEHICLE HAVING TRAILER MOUNTED THERETO

(75) Inventor: Jong Gyu Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 340 days.

(21) Appl. No.: 11/637,302

(22) Filed: Dec. 11, 2006

(65) Prior Publication Data

US 2008/0024283 A1 Jan. 31, 2008

(30) Foreign Application Priority Data

Jul. 25, 2006 (KR) ...................... 10-2006-0069609

(51) Int. Cl.
*G08B 21/00* (2006.01)

(52) U.S. Cl. ........................ 340/431; 340/432; 340/435; 340/904

(58) Field of Classification Search ................. 340/431, 340/435, 463, 436, 425.5, 903, 904, 456, 340/932.2; 367/909, 112, 96
See application file for complete search history.

(56) References Cited

U.S. PATENT DOCUMENTS

| | | | |
|---|---|---|---|
| 5,455,557 A * | 10/1995 | Noll et al. ................... | 340/431 |
| 6,446,998 B1 * | 9/2002 | Koenig et al. ............... | 280/432 |
| 6,714,124 B2 * | 3/2004 | Meyer ......................... | 340/431 |
| 6,864,782 B1 * | 3/2005 | Aaron et al. ................ | 340/431 |
| 2006/0103511 A1 * | 5/2006 | Lee et al. .................... | 340/431 |
| 2006/0125919 A1 * | 6/2006 | Camilleri et al. ........... | 348/148 |
| 2007/0103280 A1 * | 5/2007 | Kanafani .................... | 340/431 |

FOREIGN PATENT DOCUMENTS

| | | |
|---|---|---|
| JP | 61-024647 | 2/1986 |
| JP | 61-081210 | 4/1986 |
| KR | 10-1992-0011827 | 7/1992 |
| KR | 10-1997-0020700 | 5/1997 |
| KR | 10-1997-0037860 | 7/1997 |
| KR | 10-1997-0039493 | 7/1997 |
| KR | 10-1997-0039513 | 7/1997 |
| KR | 10-1998-039328 | 8/1998 |
| KR | 10-1998-076788 | 11/1998 |
| KR | 10-1998-083215 | 12/1998 |

* cited by examiner

*Primary Examiner*—Daniel Wu
*Assistant Examiner*—Charles G Curtis, III
(74) *Attorney, Agent, or Firm*—Edwards Angell Palmer & Dodge LLP; Peter F. Corless (57) ABSTRACT

Disclosed herein is a back warning buzzer system for an automotive vehicle having a trailer mounted thereto, comprising: (a) a control unit; (b) a plurality of sensors equidistantly mounted to the back bumper of the vehicle; and (c) a buzzer operable by the control unit in response to signals from the sensors. Also disclosed is a back warning method therefrom.

7 Claims, 5 Drawing Sheets

BACK WARNING BUZZER SYSTEM FOR VEHICLE HAVING TRAILER MOUNTED THERETO

CROSS-REFERENCE TO RELATED APPLICATIONS

This application claims the benefit under 35 U.S.C. §119(a) of Korean Patent Application No. 10-2006-069609, filed in the Korean Intellectual Property Office on Jul. 25, 2006, the entire disclosure of which is incorporated herein by reference.

BACKGROUND OF THE INVENTION

1. Field of the Invention

The present invention relates to a back warning buzzer system (BWS) and a back warning method for an automotive vehicle having a trailer mounted thereto, and more particularly, to a back warning buzzer system and a back warning method, which automatically detects whether or not a trailer is being pulled by a rear portion of an automotive vehicle so as to allow a back warning buzzer system to be automatically turned on or off so that the back warning buzzer system is prevented from being erroneously operated in a state where the trailer has been towed behind the vehicle.

2. Background

Commercially available BWSs for automotive vehicles pose the following problems.

For example, when the vehicle is moved backwardly, BWS can be erroneously operated by continuously emitting a beeping sound. This is a result from the fact that BWS recognizes the trailer mounted to the vehicle as a rear object.

To overcome the above problem, some automotive vehicle manufacturers have separately installed an on/off switch for allowing a driver to turn the BWS on or off at the front side of a driver's seat after the trailer has been towed behind an automotive vehicle.

In case where the on/off switch is applied to the BWS, when the trailer is mounted to the vehicle, it is recognized as a rear object during the backup of the vehicle so that a beeping warning sound is not generated, thereby providing a merit. But a driver is not provided with an aid of the BWS during an attempt to back up for the purpose of parking in a state where the BWS has been turned off.

This is contrary to an intrinsic function of the back warning buzzer system which aids in recognizing any obstacle that may exist at the rear of an automotive vehicle during the reverse movement i.e., the backup of the vehicle.

In addition, prior to or after the mounting of the trailer to an automotive vehicle, if the BWS is not turned off previously upon an attempt to backup, a beeping warning sound is triggered due to the presence of the trailer, reducing the advantage associated with the on/off switch.

Moreover, as long as a driver does not manually depress an "off" button of the on/off switch of the BWS, there occurs a shortcoming such as the case where the on/off switch does not exist, causing an inconvenience to the driver. Furthermore, a serious safety problem may occur during the driving of the vehicle in a state where the BWS is turned off.

U.S. Pat. No. 6,864,782 discloses a backup aid system and method for detecting the presence of a trailer attached thereto, in which a backup aid controller monitors a voltage level at its input electrically coupled to an electrical trailer connector and when the voltage level is above a first predetermined threshold voltage, it generates a backup warning signal based on the determination that the trailer is not towed behind an automotive vehicle, and when the voltage level is below a second predetermined threshold voltage, it disables the backup warning signal based on the determination that the trailer is towed behind the vehicle. However, such a backup aid system also entails a demerit that since it is designed such that a voltage level generated upon the coupling between the trailer and the vehicle is monitored, a separate trailer connector is required.

Accordingly, it would be desirable to provide a back warning buzzer system and back warning method for an automotive vehicle having a trailer mounted thereto, which can automatically detect whether or not a trailer is being pulled by a rear portion of the vehicle using plural sensors and vehicle speed sensors (VSSs) mounted at the back bumper of the vehicle even without separately installing an on/off switch of the back warning buzzer system so as to allow a back warning buzzer system to be automatically turned on or off so that the back warning buzzer system is prevented from being erroneously operated to continuously trigger a beeping warning sound in a state where the trailer has been towed behind the vehicle.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the present invention provides a back warning buzzer system for an automotive vehicle having a trailer mounted thereto, which comprises: (a) a control unit; (b) a plurality of sensors equidistantly mounted to the back bumper of the vehicle; and (c) a buzzer operable by the control unit in response to signals from the sensors.

In another aspect, a back warning buzzer system is provided comprising: (a) a control unit; (b) a vehicle speed sensor connected to an input side of the control unit; (c) a transmission position sensor connected to an input side of the control unit; (d) a plurality of supersonic sensors equidistantly mounted at the back bumper of the vehicle in such a fashion as to be connected to an input side of the control unit by means of a multiplexer; and (e) a buzzer connected to an output side of the control unit and adapted to be turned on/off in response to detection signals generated from the vehicle speed sensor and the supersonic sensors.

In still another aspect, a back warning method for an automotive vehicle having a trailer mounted thereto is provided, which comprises the steps of: (a) starting vehicle's engine; (b) when at least two sensors selected from a plurality of sensors equidistantly mounted to the back bumper of the vehicle detect a rear object with the transmission in "P" or "N" position and a distance between the vehicle and the rear object is within a predetermined range, allowing a control unit to determine that the trailer is towed behind the vehicle so as to control the selected sensors to be turned on and a buzzer to be turned off after the lapse of three seconds; (c) when the selected sensors detect the rear object with the transmission in "P" or "N" position and the distance between the vehicle and the rear object is beyond the predetermined range, allowing the control unit to determine that the rear object is a general obstacle so as to control all of the plurality of sensors to be turned on and the buzzer to be turned on; (d) when the vehicle is stopped with the transmission in "R" position for a long time period, allowing the control unit to control the selected sensors to be turned on and the buzzer to be turned off; and (e) when the vehicle is operated during the stop of the vehicle with the transmission in "R" position for a long time period, allowing the control unit to control all of the plurality of sensors to be turned on and the buzzer to be turned on.

In a further aspect, motor vehicles are provided that comprise a described buzzer system or comprise a buzzer system controlled by a described method.

It is understood that the term "vehicle" or other similar term as used herein is inclusive of motor vehicles in general such as passenger automobiles, buses, trucks, various commercial vehicles, and the like.

Other aspects of the invention are discussed infra.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

As discussed above, in one aspect, a back warning buzzer system for an automotive vehicle having a trailer mounted thereto is provided, which comprises: (a) a control unit; (b) a plurality of sensors equidistantly mounted to the back bumper of the vehicle; and (c) a buzzer operable by the control unit in response to signals from the sensors.

Sensors may include any kind of sensors that can be used for backup warning purpose. Preferred sensors comprise supersonic sensors.

Preferably, sensors may be connected to an input side of the control unit. For example, they may be connected to the control unit by means of multiplexer.

Suitably, back warning buzzer systems of the present invention may further comprise a vehicle speed sensor preferably connected to an input side of the control unit. Also suitably, back warning buzzer systems of the present invention may further comprise a transmission position sensor preferably connected to an input side of the control unit.

In another aspect, the present invention provides a back warning buzzer system for an automotive vehicle having a trailer mounted thereto, comprising: (a) a control unit; (b) a vehicle speed sensor connected to an input side of the control unit; (c) a transmission position sensor connected to an input side of the control unit; (d) a plurality of supersonic sensors equidistantly mounted at the back bumper of the vehicle in such a fashion as to be connected to an input side of the control unit by means of a multiplexer; and (e) a buzzer connected to an output side of the control unit and adapted to be turned on/off in response to detection signals generated from the vehicle speed sensor and the supersonic sensors.

In still another aspect, the present invention provides a back warning method for an automotive vehicle having a trailer mounted thereto. A preferred method of the present invention comprises the steps of: (a) starting vehicle's engine; (b) when at least two sensors selected from a plurality of sensors equidistantly mounted to the back bumper of the vehicle detect a rear object with the transmission in "P" or "N" position and a distance between the vehicle and the rear object is within a predetermined range, allowing a control unit to determine that the trailer is towed behind the vehicle so as to control the selected sensors to be turned on and a buzzer to be turned off after the lapse of three seconds; (c) when the selected sensors detect the rear object with the transmission in "P" or "N" position and the distance between the vehicle and the rear object is beyond the predetermined range, allowing the control unit to determine that the rear object is a general obstacle so as to control all of the plurality of sensors to be turned on and the buzzer to be turned on; (d) when the vehicle is stopped with the transmission in "R" position for a long time period, allowing the control unit to control the selected sensors to be turned on and the buzzer to be turned off; and (e) when the vehicle is operated during the stop of the vehicle with the transmission in "R" position for a long time period, allowing the control unit to control all of the plurality of sensors to be turned on and the buzzer to be turned on.

Sensors may include any kind of sensors that can be used for backup warning purpose. Preferred sensors comprise supersonic sensors.

Preferably, the present invention may employ a plurality of sensors. For example, two, three, four or more supersonic sensors may be used.

In a preferred embodiment of the present invention, the step of allowing a control unit to determine that the trailer is towed behind the vehicle so as to control the selected two supersonic sensors to be turned on and a buzzer to be turned off after the lapse of three seconds may comprise the steps of: (a) detecting the distance between the vehicle and the trailer by obtaining an average distance value between the trailer and the selected two supersonic sensors which is sensed by the selected two supersonic sensors; (b) allowing the control unit to determine whether or not the average distance value is within a predetermined range; and (c) when the average distance value is within the predetermined range, allowing the control unit to control the selected two supersonic sensors to be turned on and a buzzer to be turned off.

In another preferred embodiment, when a vehicle moves forward after the vehicle's engine gets started, the control unit may suitably receive a signal from a vehicle speed sensor so as to control all of the plurality of supersonic sensors and the buzzer to be turned off.

In still another preferred embodiment, when the trailer is mounted to the rear portion of the vehicle after the vehicle's engine gets started with the transmission in "D" or "P/N" position, the control unit may suitably receive a signal from a transmission position sensor so as to control all of the plurality of supersonic sensors to be turned off and the buzzer to be turned on.

Preferably, the predetermined range may be less than the distance between the vehicle and the trailer. For instance, it may be less than 48 cm.

In a further aspect, the present invention also provides a motor vehicle that comprises a described buzzer system or a buzzer system controllable by a described method.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 1:
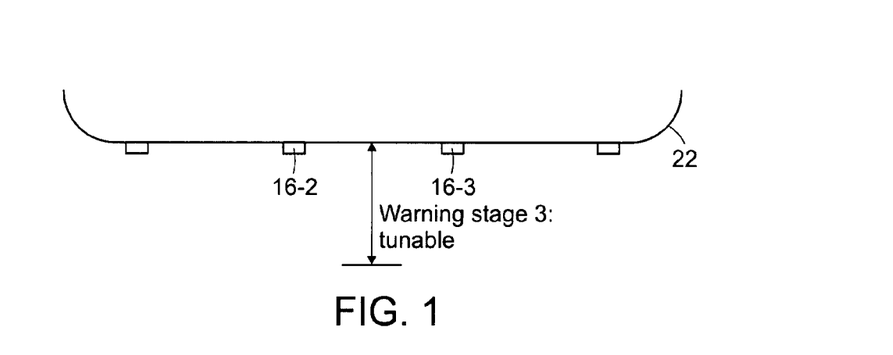
FIG. 1 is a schematic view illustrating the mounting positions of supersonic sensors of a back warning buzzer system for an automotive vehicle having a trailer mounted thereto according to the present invention.
Figure 2A:
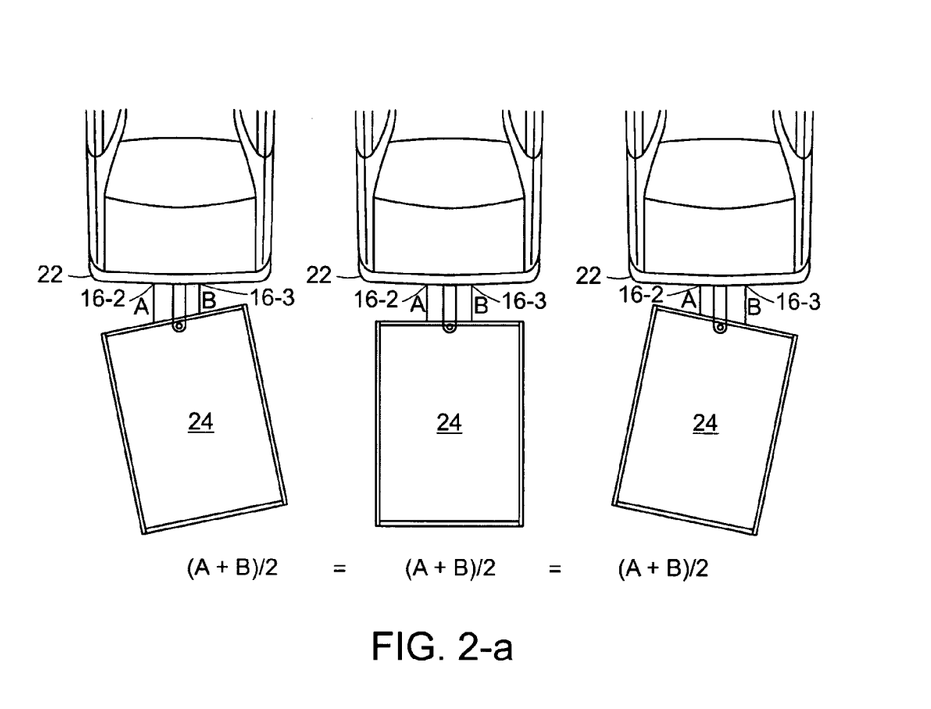
FIGS. 2a and 2b are schematic views illustrating a process of uniformly detecting a distance between a trailer and supersonic sensors of a back warning buzzer system for an automotive vehicle having a trailer mounted thereto according to the present invention.
Figure 2B:
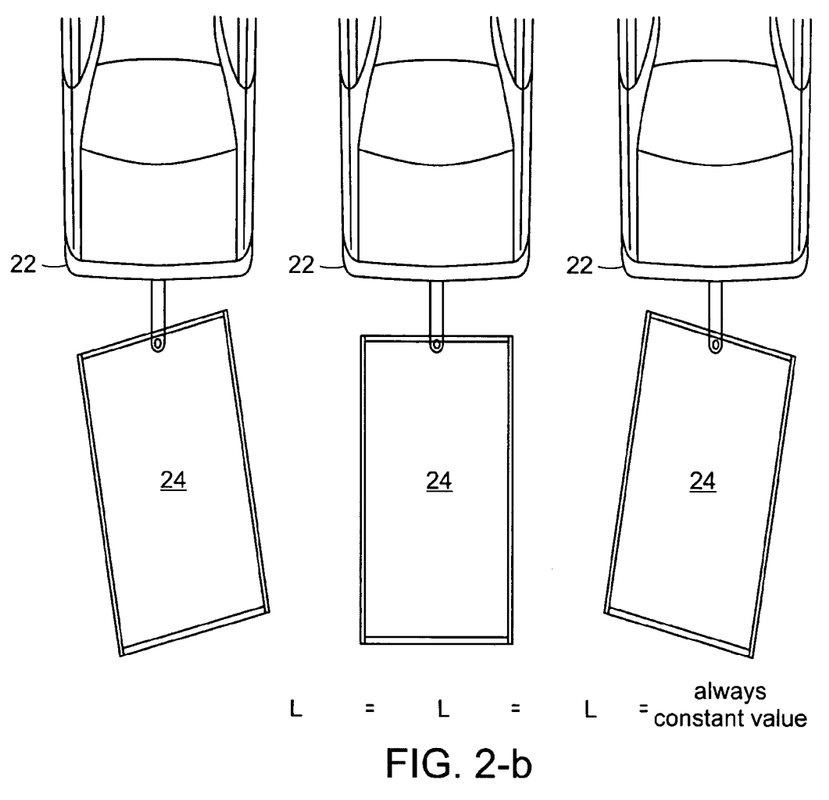
Figure 3:
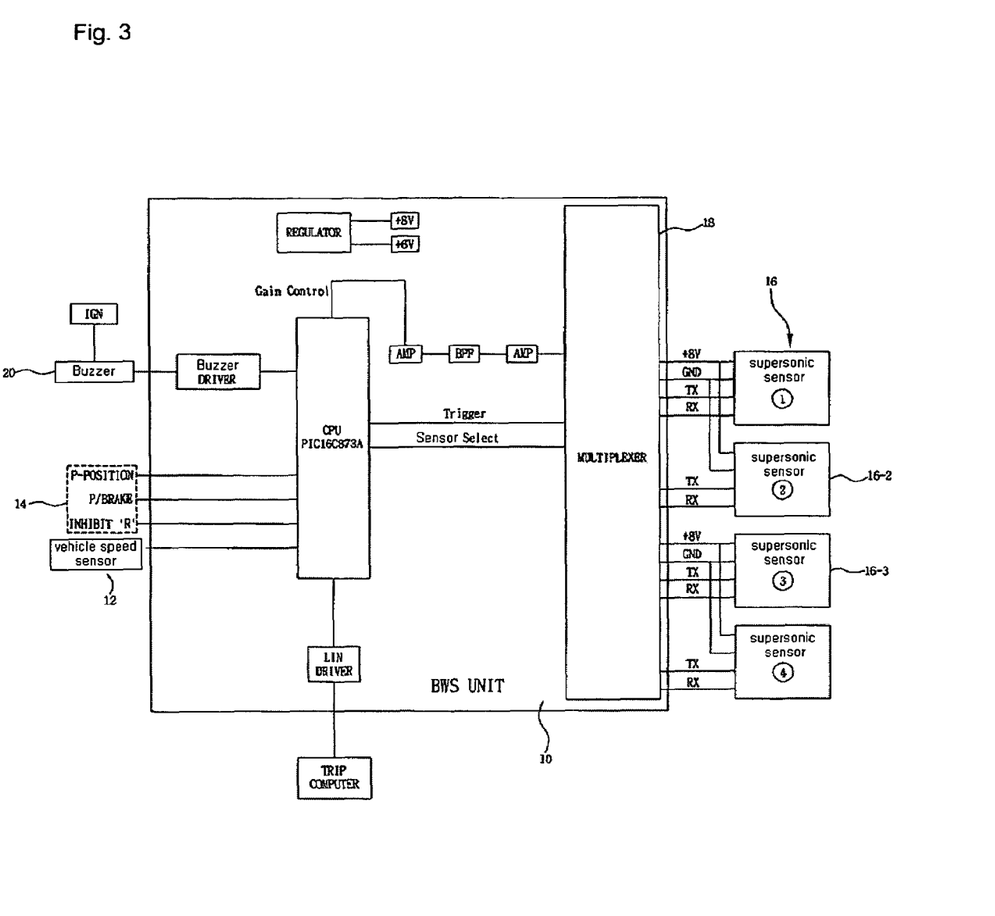
FIG. 3 is a circuit block diagram illustrating a back warning buzzer system for an automotive vehicle having a trailer mounted thereto according to the present invention.

FIG. 1 is a schematic view illustrating the mounting positions of supersonic sensors of a back warning buzzer system for an automotive vehicle having a trailer mounted thereto according to the present invention. FIGS. 2a and 2b are schematic views illustrating a process of uniformly detecting a distance between a trailer and supersonic sensors of a back warning buzzer system for an automotive vehicle having a trailer mounted thereto according to the present invention. FIG. 3 is a circuit block diagram illustrating a back warning buzzer system for an automotive vehicle having a trailer mounted thereto according to the present invention.

Normally, a back warning buzzer system is intended to be operated only with an input at an "R" step. However, the back warning buzzer system of the present invention may allow at least two selected supersonic sensors (e.g., a second supersonic sensor and a third supersonic sensor) only or all of the sensors to be operated depending on the circumstances with the transmission in "N (for neutral)", "D (for driving)", "P (for park)" and "R (for reverse)" positions. Similarly, a buzzer may also be automatically turned on or off.

That is, the back warning buzzer system according to the present invention may turn on or off the supersonic sensors and the buzzer as follows.

Upon detection of obstacles during typical backup: both all of the supersonic sensors and the buzzer are turned on.

Upon determination that a trailer is towed behind an automotive vehicle: second and third supersonic sensors are turned on and the buzzer is turned off.

Upon vehicle stop with the transmission in "R" position for a long time period: second and third supersonic sensors are turned on and the buzzer is turned off.

Upon movement of the vehicle during the stop thereof with the transmission in "R" position for a long time period: both all of the supersonic sensors and the buzzer are turned on.

The configuration of the back warning buzzer system for its operation will be described hereinafter.

As shown in FIG. 3, the back warning buzzer system according to the present invention may include a vehicle speed sensor 12 and a transmission position sensor 14 which are connected to an input side of a control unit 10 including a microprocessor. Also, a plurality of supersonic sensors 16 are mounted at the back bumper of the vehicle to be spaced apart from one another at equal intervals. In this case, the plural supersonic sensors 16 are connected to the input side of the control unit 10 by means of a multiplexer 18.

On the other hand, to an output side of the control unit 10 is connected a buzzer 20 which is adapted to be turned on/off in response to a detection signal generated from the vehicle speed sensor 12 and the supersonic sensors 16.

Now, a method in which the supersonic sensors detect whether or not a trailer is mounted behind an automotive vehicle will be described hereinafter with reference to FIGS. 1, 2a and 2b.

As shown in FIGS. 1 and 2a, the present invention may preferably employ four supersonic sensors 16 mounted equidistantly at the back bumper of the vehicle for sensing a rear object. The amount (=distance between the vehicle and the trailer) detected by a second supersonic sensor (16-2) is A and the amount (=distance between the vehicle and the trailer) detected by a third supersonic sensor (16-3) is B. The sum of the amounts (A+B) remains constant.

That is, when a vehicle turns left or right, or moves forwardly or backwardly, the sum value (A+B) does not vary. Thus, an average amount ((A+B)/2) refers to a distance between a vehicle 22 and a trailer 24. At this time, when the average amount keeps constant during the movement of the vehicle within a range of a warning stage 3 (48 cm: a distance allowing for the mounting of the trailer=a distance between the rear portion of the vehicle and the trailer), it indicates that a rear object is the trailer 24.

As a result, when the average distance L between the trailer 24 and the second and third supersonic sensors 16-2 and 16-3 among four supersonic sensors 16 arranged at the back bumper of the vehicle keeps constant during the movement of the vehicle, it indicates that the trailer 24 is towed behind the vehicle.

At this time, the warning stage 3 (less than 48 cm) can be adjusted depending on vehicle type.

Also preferably, as shown in FIG. 2b, three supersonic sensors 16 can be equidistantly arranged at the back bumper 22 of the vehicle. This configuration also bases the principle that a distance L between a central supersonic sensor of the three supersonic sensors 16 and the trailer is constant.

Now, an obstacle detecting function of the back warning buzzer system when the vehicle's ignition switch is in the "on" position (IGN ON) will be described hereinafter.

Figure 4:
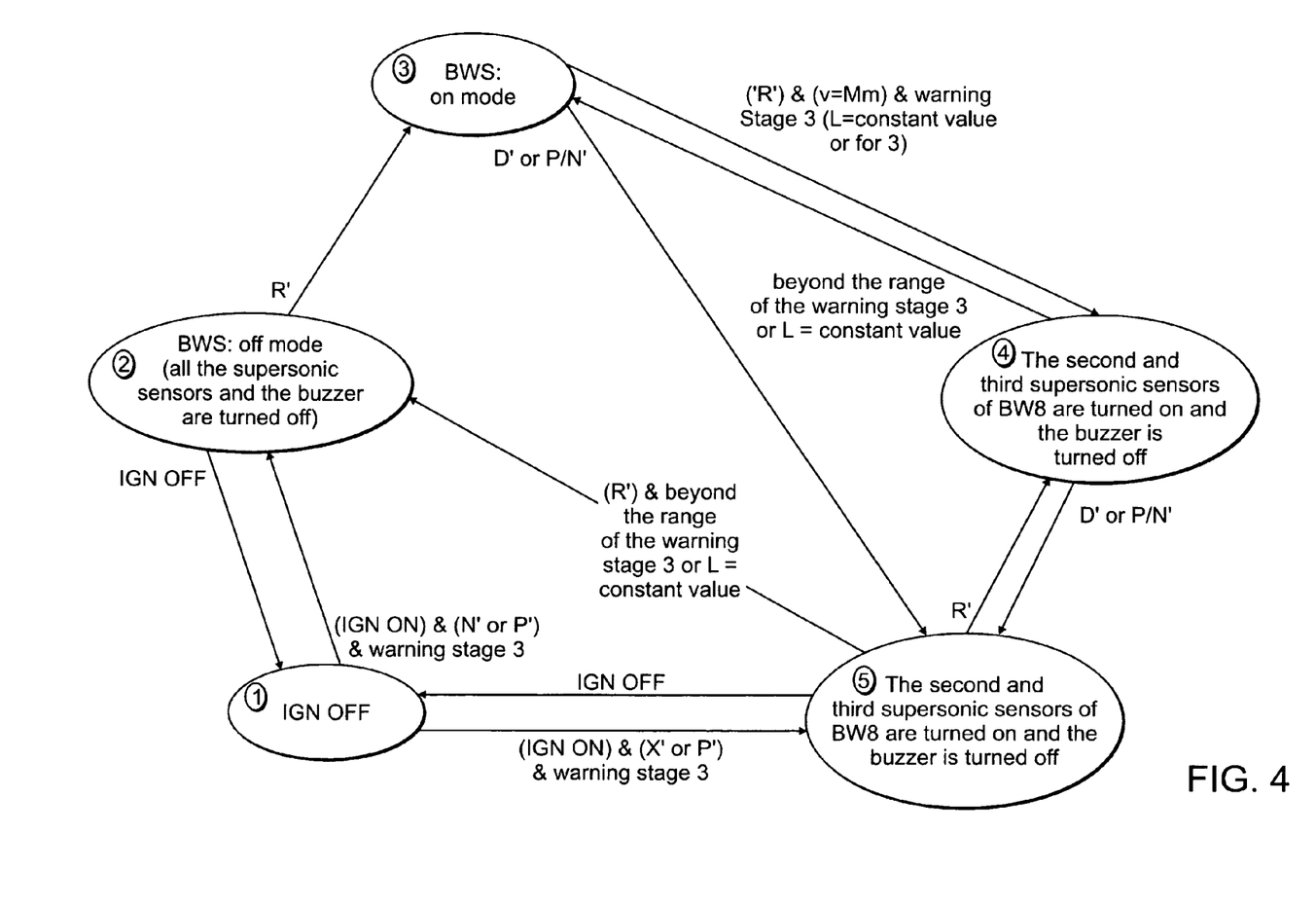
FIG. 4 is a schematic diagrammatic view illustrating an operational sequence of a back warning buzzer system for an automotive vehicle having a trailer mounted thereto according to the present invention.
Figure 5:
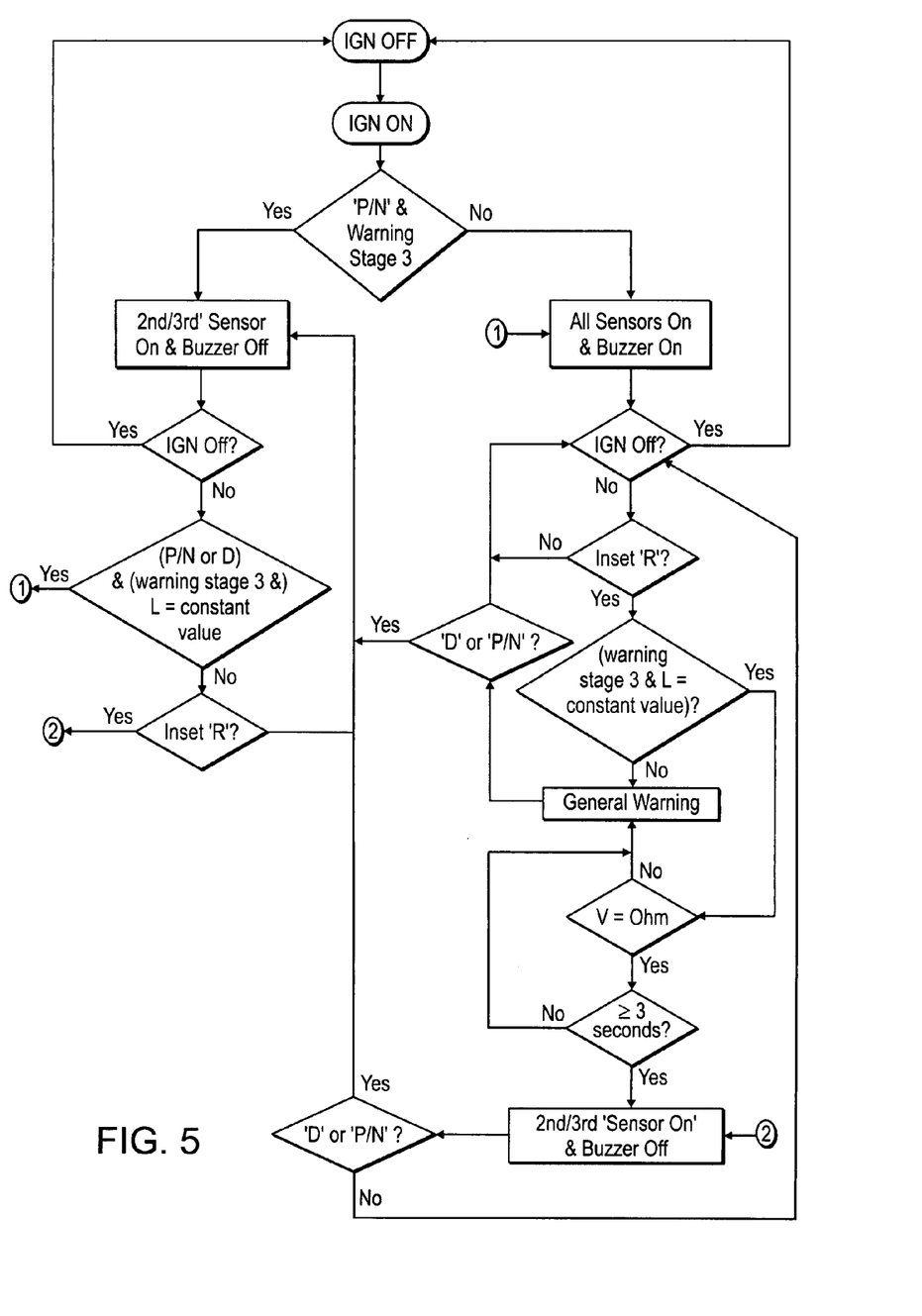
FIG. 5 is a flowchart illustrating an operational process of a back warning buzzer system for an automotive vehicle having a trailer mounted thereto according to the present invention.

FIG. 4 is a schematic diagrammatic view illustrating an operational sequence of a back warning buzzer system for an automotive vehicle having a trailer mounted thereto according to the present invention. FIG. 5 is a flowchart illustrating an operational process of a back warning buzzer system for an automotive vehicle having a trailer mounted thereto according to the present invention.

Referring to FIG. 4, when the vehicle's engine is started (with the transmission in "P" or "N" position), the second and the third supersonic sensors are actuated. Then, the distance between the vehicle and a rear obstacle is detected. When the distance is within a range of the warning stage 3, i.e., less than 48 cm, the control unit 10 recognizes that the rear obstacle is a trailer and the program executes step ⑤ where the second and third supersonic sensors are activated and the buzzer is turned off.

On the other hand, when the distance is beyond the range of the warning stage 3, i.e., more than 48 cm, the control unit 10 recognizes that the rear obstacle is a trailer and the program executes step ② where the second and third supersonic sensors are inactivated and the buzzer is turned off.

Here, a buzzer-off operation and a buzzer-on operation of the back warning buzzer system according to the stopping and movement of the vehicle and will be described hereafter.

When a warning sound continues to be triggered for three seconds within the range of the warning stage 3 (less than 48 cm), the buzzer is automatically tuned off and when the vehicle moves forward or rearward in a state where a rear object is a general obstacle, but not the trailer, the buzzer is turned on.

That is, in step ③ ("on" state of the back warning buzzer system) of FIG. 4, i.e., the operation state of a general back warning buzzer system, when the distance between the vehicle and the trailer detected by the second and third supersonic sensors 16-2 and 16-3 is constantly maintained within the range of the warning stage 3 of less than 48 cm in a state where the vehicle is stopped with the transmission in "R" position, the buzzer is turned on to continue to trigger a warning sound for three seconds and then the program executes step ④ where only the second and third supersonic sensors are activated and the buzzer is turned off.

Then, if it is determined by signals from the second and third supersonic sensors that a rear object is a general obstacle, but not the trailer, i.e., if an average distance L between the second and third supersonic sensors and the trailer is not constantly maintained, the program returns to step ③ ("on" state of the back warning buzzer system) where the buzzer is again turned on.

The operations of the back warning buzzer system depending on whether or not the trailer is towed behind the vehicle prior to/after the starting-on of the vehicle's engine will be described hereinafter in more detail.

1. In case where vehicle engine gets started while no trailer is mounted (a) In case where the vehicle moves forward after the starting-on of the vehicle's engine After the vehicle's engine has been started on (IGN ON), if it is determined that the warning stage 3 is not applicable, i.e., the trailer does not exist within a distance of less than 48 cm based on the detection of the respective supersonic sensors of the back warning buzzer system, the program executes step ② of FIG. 4 where all of the supersonic sensors and the buzzer are turned off by the control unit.

That is, since the vehicle is moving forward, the back warning buzzer system is not operated.

(b) In case where the vehicle is stopped during its forward movement and is backed up or parked When the transmission is put into an "R" position in a state of step ② ("off" state of the BWS), the control unit allows the program to executes step ③ ("on" state of the BWS) where all of the supersonic sensors and the buzzer are turned on. In this case, a warning sound is triggered when all of the supersonic sensors detect a rear obstacle.

At this time, in step ③ ("on" state of the BWS), when the transmission is shifted to "P/N" or "D" position from "R" position, the program transits to step ② ("off" state of the BWS).

2. In case where vehicle engine gets started while a trailer is mounted (a) In case where the vehicle moves forward after the starting-on of the vehicle's engine After the vehicle's engine has been started on (IGN ON), if it is determined that the warning stage 3 is applicable, i.e., the trailer exists within a distance of less than 48 cm based on the detection of the respective supersonic sensors of the back warning buzzer system and then the vehicle moves forward, the program executes step ⑤ of FIG. 4 where the second and third supersonic sensors are turned on and the buzzer are turned off (Buzzer OFF) by the control unit.

(b) In case where the vehicle is stopped during its forward movement and is backed up or parked When the second and third supersonic sensors detect the warning stage 3 and is transmitting a signal generated therefrom to the control unit, the control unit determines that the trailer is towed behind the vehicle.

This state can be referred to as a warning mode of the BWS.

That is, when the transmission is put into an "R" position in step ⑤ of FIG. 4, the control unit allows the program to transit to step ④ where the second and third supersonic sensors are turned on and the buzzer is turned off. Thus, a warning sound is not triggered.

(c) In case where the trailer is mounted to the vehicle with the transmission in "D" or "P/N" position after the starting-on of the vehicle's engine After the vehicle's engine has been started on (IGN ON), since the BWS initially has the trailer mounted to the vehicle, the program transits to step ② ("off" state of the BWS).

In this step, when the trailer is mounted to the vehicle, the BWS is maintained in a state of step ②, i.e., the "off" state, where all of the supersonic sensors and the buzzer are turned off.

3. In case where BWS is operated in other situations than the above (a) In case where a rear object of the vehicle is not the trailer prior to the starting-on of the vehicle's engine During the starting-on of the vehicle's engine, when it is determined based on the detection of the second and third supersonic sensors that the rear object exists within the range of the warning stage 3 (less than 48 cm), the program executes the warning mode where the second and the third supersonic sensors are turned on and the buzzer is turned off.

Subsequently, when the vehicle moves forward in a state of step ⑤, the vehicle and the rear obstacle do not maintain a constant distance therebetween, and hence the program transits to step ② where all of the supersonic sensors and the buzzer are turned off.

(b) In case where the vehicle is stopped during its forward movement and the trailer is mounted to the vehicle with the transmission in "R" position after the starting-on of the vehicle's engine After the vehicle's engine has been started on, since the BWS initially has the trailer mounted to the vehicle, the program transits to step ② ("off" state of the BWS) where all of the supersonic sensors and the buzzer are turned off. When the transmission is put into an "R" position in step ② of FIG. 4, the control unit allows the program to transit to step ③ where the second and third supersonic sensors and the buzzer are turned on. In this state, when the trailer is mounted to the vehicle, all of the supersonic sensors and the buzzer are turned on to enable the buzzer to trigger a warning sound.

Thereafter, at the moment when the mounting of the trailer to the vehicle is completed, the distance between the vehicle and the trailer is constantly maintained within the range of the warning stage (less than 48 cm), and hence the program transits to step ④ in three seconds after the mounting of the trailer to the vehicle has been completed. In step ④, the second and third supersonic sensors only are turned on and the buzzer is turned off to prevent the buzzer from making a warning sound any longer.

(c) In case where a rear obstacle of the vehicle is within the range of the warning stage 3 after the starting-on of the vehicle's engine in a state of no trailer The vehicle moves rearward and is put into a state of maintaining the warning stage 3. In this case, after the lapse of three seconds at the stopping state of the vehicle, when the vehicle re-moves rearward, the program proceeds to the steps ①, ②, ③ and ④ of FIG. 4 in this order. A problem occurs, however, that the distance between the vehicle and the rear obstacle cannot be maintained constantly (i.e., L≠constant value), so that the program transits to the step ③ where all of the supersonic sensors and the buzzer are turned on to enable the buzzer to trigger a warning sound.

The above situation may occur when the vehicle is backed up at a tollgate or a parking lot. If the vehicle is stopped within the range of the warning stage 3, i.e., less than 48 cm and the distance between the vehicle and the rear obstacle is maintained constantly, when any obstacle approaches behind the vehicle or the vehicle is backed up after the triggering of the warning sound has been interrupted temporarily, the warning sound is re-triggered, causing no safety problem.

(d) In case where the vehicle is stopped during its forward movement and is backed up or parked after the trailer has been mounted to the vehicle in three seconds This case is classified into two situations: (a) a first situation where the vehicle is parked after the trailer has been towed behind the vehicle in three seconds in step ② of FIG. 4 in which all of the supersonic sensors and the buzzer are turned off ("off" state of the BWS), and (b) a second situation where the vehicle is parked during its forward movement after the trailer has been towed behind the vehicle in three seconds in step ③ of FIG. 4 in which all of the supersonic sensors and the buzzer are turned on ("on" state of the BWS).

In these two situations, it is nearly impossible to tow the trailer behind the vehicle, but it is possible to cope with a sudden emergency.

For the first situation, when the vehicle is attempted to be parked after the trailer has been towed behind the vehicle in three seconds in step ④ of FIG. 4 in which all of the supersonic sensors and the buzzer are turned off ("off" state of the BWS), the program transits to step ③ of FIG. 4 in which all of the supersonic sensors and the buzzer are turned on ("on" state of the BWS) and then the distance between the vehicle and the trailer is constantly maintained within the range of the warning stage 3 (L=constant value) based on the detection of the second and third supersonic sensors. Thus, the program transits to step ④ with the transmission in "R" position where the second and third supersonic sensors are turned on and the buzzer is turned off.

Thereafter, since the trailer continues to be towed behind the vehicle so that the distance between the vehicle and the trailer is constantly maintained, if the transmission is put into "P/N" or "D" position, the program proceeds to step ⑤ where the second and third supersonic sensors are turned on and the buzzer is turned off. On the other hand, if the transmission is put into "R" position, the program proceeds to step ④ where the second and third supersonic sensors are turned on and the buzzer is turned off.

For the second situation, the vehicle is parked during its forward movement after the trailer has been towed behind the vehicle in three seconds in step ③ of FIG. 4 in which all of the supersonic sensors and the buzzer are turned on ("on" state of the BWS). When the transmission is put into "P/N" or "D" position prior to the lapse of three seconds in step ③, the program transits to step ⑤ where the second and third supersonic sensors are turned on and the buzzer is turned off.

In this state, the second and third supersonic sensors continuously detect whether or not the distance between the vehicle and the trailer is constantly maintained. When the vehicle is parked during its forward movement, the transmission is alternately put into "R" position and "P/N" or "D" position. At this time, the transition of the program between steps ⑤ and ④ is repeatedly performed, at which time the buzzer is turned off.

(e) In case where the vehicle is stopped during its forward movement and another vehicle approaches behind the vehicle within the range of the warning stage 3 prior to or after the starting-on of the vehicle's engine First, before the vehicle's engine is started, when the distance between the rear portion of the vehicle and the other vehicle is maintained within the range of less than 48 cm, the BWS allows the control unit to control the program to transit to step ⑤ where the second and third supersonic sensors are turned on and the buzzer is turned off.

In this case, when the other vehicle follows behind the vehicle with the distance between the rear portion of the vehicle and the other vehicle maintained within the range of less than 48 cm while a driver of the vehicle drives forward, the program maintains step ⑤ where the second and third supersonic sensors are activated and the buzzer is turned off to prevent the buzzer from triggering a warning sound. At this state, when the other vehicle is moved far away from the driver's vehicle, the program transits to step ⑤ from step ②. As a result, in step ⑤, all of the supersonic sensors and the buzzer are turned off.

As apparent from the foregoing, according to back warning buzzer system and back warning method for an automotive vehicle having a trailer mounted thereto provides the following advantages:

First, it is possible to automatically detect whether or not a trailer is being towed behind an automotive vehicle so as to allow the buzzer of the BWS to be automatically turned off so that a driver's inconvenience of having to manually turn off the switch can be eliminated.

Second, if the trailer is separated from the vehicle in a state where the BWS is turned off, the BWS is automatically turned on based on the detection of non-existence of trailer, ensuring performance of intrinsic function of buzzer system.

Third, if a vehicle does not move while a driver unavoidably puts the transmission into a reverse (R) position, the BWS is automatically turned off for the sake of customer convenience and then the BWS is automatically turned on upon the detection of the movement of the vehicle, which improves psychological quality of the vehicle product, unlike conventional methods in which a warning sound continues to be triggered upon the detection of a rear obstacle of the vehicle in a state where the vehicle is backed up.

Fourth, an additional cost that would be incurred to separately install an existing on/off switch to the BWS can be reduced. It is also possible to avoid modification of a design such as a layout for installation of separate on/off switch to the BWS.

While the present invention has been described with reference to preferred embodiments thereof, it will be appreciated by those skilled in the art that changes may be made in these embodiments without departing from the principles and spirit of the invention, the scope of which is defined in the appended claims and their equivalents.

What is claimed is:

1. A back warning method for an automotive vehicle having a trailer mounted thereto, comprising the steps of:
  (a) starting vehicle's engine;
  (b) when at least two sensors selected from a plurality of sensors equidistantly mounted to the back bumper of the vehicle detect a rear object with the transmission in "P" or "N" position and a distance between the vehicle and the rear object is within a predetermined range, allowing a control unit to determine that the trailer is towed behind the vehicle so as to control the selected sensors to be turned on and a buzzer to be turned off after the lapse of three seconds;
  (c) when the selected sensors detect the rear object with the transmission in "P" or "N" position and the distance between the vehicle and the rear object is beyond the predetermined range, allowing the control unit to determine that the rear object is a general obstacle so as to control all of the plurality of sensors to be turned on and the buzzer to be turned on;
  (d) when the vehicle is stopped with the transmission in "R" position for a sufficient time period, allowing the control unit to control the selected sensors to be turned on and the buzzer to be turned off; and
  (e) when the vehicle is operated during the stop of the vehicle with the transmission in "R" position for a sufficient time period, allowing the control unit to control all of the plurality of sensors to be turned on and the buzzer to be turned on.

2. The method of claim 1, wherein the sensors are supersonic sensors.

3. The method of claim 2, wherein the step of allowing a control unit to determine that the trailer is towed behind the vehicle so as to control the selected two supersonic sensors to be turned on and a buzzer to be turned off after the lapse of three seconds, comprises the steps of:
(a) detecting the distance between the vehicle and the trailer by obtaining an average distance value between the trailer and the selected two supersonic sensors, which is sensed by the selected two supersonic sensors;
(b) allowing the control unit to determine whether or not the average distance value is within a predetermined range; and
(c) when the average distance value is within the predetermined range, allowing the control unit to control the selected two supersonic sensors to be turned on and a buzzer to be turned off.

4. The method of claim 3, wherein when the vehicle moves forward after the vehicle's engine gets started, the control unit receives a signal from a vehicle speed sensor so as to control all of the plurality of supersonic sensors and the buzzer to be turned off.

5. The method of claim 3, wherein when the trailer is mounted to the rear portion of the vehicle after the vehicle's engine gets started with the transmission in "D" or "P/N" position, the control unit receives a signal from a transmission position sensor so as to control all of the plurality of supersonic sensors to be turned off and the buzzer to be turned on.

6. The method of claim 1, wherein the predetermined range is less than the distance between the vehicle and the trailer.

7. The method of claim 3, wherein the predetermined range is less than 48 cm.

* * * * *